United States Patent [19]

Sekigawa

[11] 4,323,974
[45] Apr. 6, 1982

[54] METHOD OF RESTORING A PICTURE THROUGH ESTIMATION

[75] Inventor: Keiji Sekigawa, Yokohama, Japan

[73] Assignee: Ricoh Co., Ltd., Tokyo, Japan

[21] Appl. No.: 127,471

[22] Filed: Mar. 5, 1980

[30] Foreign Application Priority Data

Mar. 7, 1979 [JP] Japan ................................ 54-26502

[51] Int. Cl.³ .................... G06F 15/20; H04N 5/14
[52] U.S. Cl. .................................. 364/515; 358/166; 358/284
[58] Field of Search ................. 364/515; 358/166, 284

[56] References Cited

U.S. PATENT DOCUMENTS

| | | | |
|---|---|---|---|
| 4,127,873 | 11/1978 | Katagi | 358/166 |
| 4,150,401 | 4/1979 | Yamamoto et al. | 358/284 X |
| 4,184,206 | 1/1980 | Harano | 364/515 |
| 4,215,414 | 7/1980 | Huelsman | 364/515 |
| 4,231,095 | 10/1980 | Cassagne | 364/515 |

*Primary Examiner*—Jerry Smith
*Attorney, Agent, or Firm*—Oblon, Fisher, Spivak, McClelland & Maier

[57] ABSTRACT

In a picture restoring method, an original picture is divided into picture elements arranged in matrix form, the picture elements are grouped into picture element regions each of which has an arrangement of nxn picture elements, and each picture element region is divided into a minute picture element region having an arrangement of 1.5n×1.5n minute picture elements. The density levels of the minute picture element in each minute picture element region are determined black or white according to the average value of the density levels of the picture elements of each picture element region and the density level data of selected minute picture elements among the minute picture elements of each minute picture element region, the density level data being obtained through calculation using the decimal-quantized density levels of the picture elements of each picture element region.

2 Claims, 6 Drawing Figures

F I G. 3
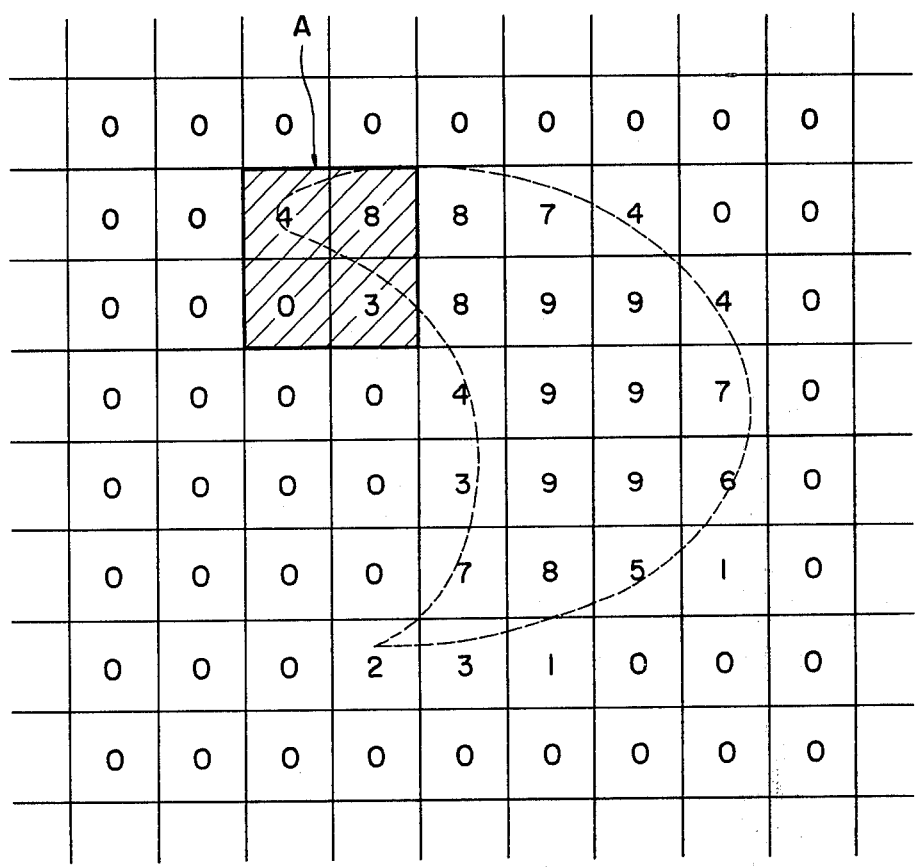

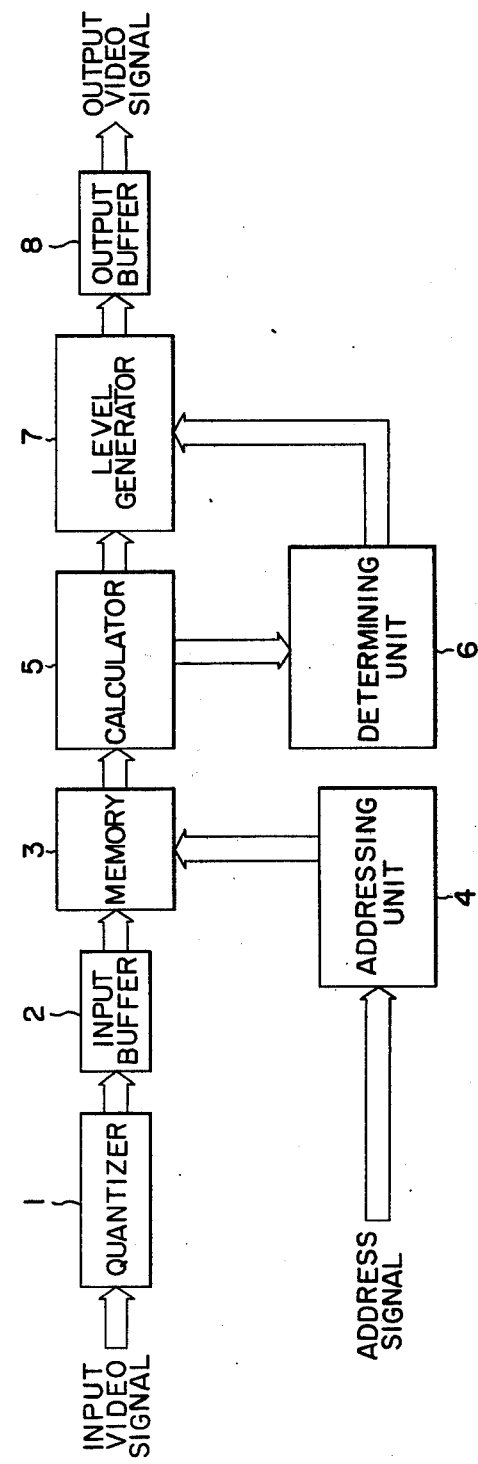

METHOD OF RESTORING A PICTURE THROUGH ESTIMATION

BACKGROUND OF THE INVENTION

This invention relates to a method of restoring a picture through estimation, in which a picture is read by sampling it in relatively low picture element concentration and is restored as a picture higher in picture element concentration.

In general, in a digital type copying machine or in a facsimile equipment, an original picture is scanned by a scanner to provide electrical signals, which are converted into digital signals by an analog-to-digital converter, so that the picture is sampled according to its density levels. That is, the picture is read as the density levels of picture elements forming the picture.

In this connection, in order to simplify a reader adapted to read a picture and to reduce the capacity of a transmission path used in digitally transmitting video signals, the number of bits per picture element is reduced by sampling an original picture in a relatively low picture element concentration, so that the picture is read in a relatively low picture element concentration. The picture thus read is reproduced as a picture higher in picture element concentration by a suitable processing means so that the reproduced picture is improved in quality. The processing means is, for instance, a calculating means such as an electronic computer. The processing means operates to estimate through simulation how the input picture is varied when reproduced, so that the resolution of the picture whose picture element concentration is relatively low as described above is improved. In this estimating operation, the most important thing is how accurately the curves in the original picture was reproduced.

In a conventional method of this type, an original picture is divided into square picture elements in relatively low concentration, and the picture elements are sampled to provide white and black level data, so that the picture is represented by bits, i.e. a binary picture is provided, and a picture higher in picture element concentration is reproduced from the binary picture. In this case, in order that the curves of the original picture are reproduced as smooth curves, a particular picture element is divided into four minute picture elements, and the density levels of the minute picture elements are statistically determined white or black from the density level data of the particular picture element and those of the picture elements surrounding the particular picture element (cf. Japanese Patent Laid-Open No. 41115/1978).

However, if an original picture is sampled in 4 picture elements/mm × 4 picture elements/mm and is restored in 8 picture elements/mm × 8 picture elements/mm according to the conventional method described above, then it is difficult to reproduce the curves in the picture as satisfactorily smooth curves; that is, the resolution of the reproduced picture is inadequate (cf. FIG. 5).

SUMMARY OF THE INVENTION

In view of the foregoing, an object of this invention is to provide a method of restoring a picture through estimation in which, when an original picture sampled in relatively low picture element concentration is reproduced as a picture higher in picture element concentration, especially the curves in the original picture are improved in resolution.

The foregoing object and other objects of the invention have been achieved by the provision of a method of restoring a picture through estimation, which, according to the invention, comprises the steps of: reading an original picture into a plurality of first picture elements by sampling the original picture in relatively low picture element concentration, the first picture elements being divided into first picture element regions each of which has an arrangement of n×n first picture elements; converting each first picture element region into a second picture element region which has an arrangement of 1.5 n×1.5 n second picture elements each of which is smaller in area than each first picture element; subjecting the density levels of the first picture elements in each first picture element region to decimal quantization to provide the average value of the density levels thus decimal-quantized; obtaining the density level data of predetermined second picture elements in each second picture element region by using predetermined equations corresponding to the distribution of the density levels of the first picture elements in each first picture element region; and determining the density levels of said second picture elements in each second picture element region as black or white according to the average value and the order in magnitude of the density level data.

The nature, principle and utility of the invention will become more apparent from the following detailed description when read in conjunction with the accompanying drawings.

BRIEF DESCRIPTION OF THE INVENTION

In the accompanying drawings:

FIG. 3 is an explanatory diagram showing picture elements of the original picture which are obtained by reading the original picture in relatively low picture element concentration and are subjected to decimal quantization;

FIG. 6 is a block diagram showing one example of an apparatus for practicing the method of the invention.

DETAILED DESCRIPTION OF THE INVENTION

Figure 1:
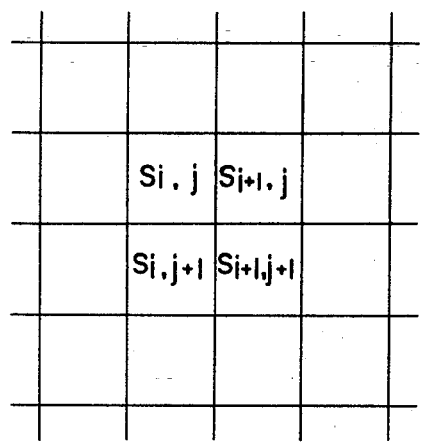
FIG. 1 is an explanatory diagram showing a picture element region having an arrangement of 2×2 picture elements of an original picture.
Figure 2:
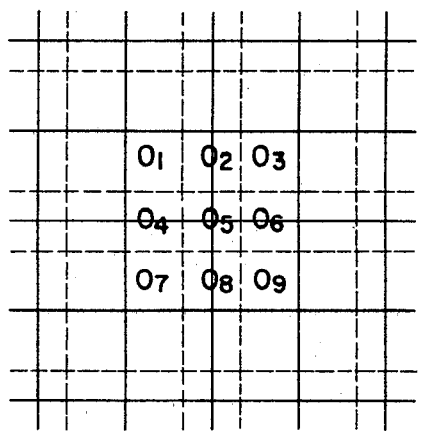
FIG. 2 is an explanatory diagram showing a minute picture element region having an arrangement of 3×3 minute picture elements.

First, a method of restoring a picture by estimation according to this invention will be described with reference to the case where a picture element region having an arrangement of 2×2 picture elements in FIG. 1 is converted into a picture element region having an arrangement of 3×3 picture elements as shown in FIG. 2.

In the first step of the method of the invention, the four picture elements $S_{i,j}$, $S_{i+1,j}$, $S_{i,j+1}$ and $S_{i+1,j+1}$ are subjected to decimal quantization to have density levels $SQ_{i,j}$, $SQ_{i+1,j}$, $SQ_{i,j+1}$ and $SQ_{i+1,j+1}$, respectively, and the average density level $\overline{Q}$ of the four-picture-element region is calculated by using the following equation (1):

$$\overline{Q} = \tfrac{1}{4} \cdot (SQ_{i,j} + SQ_{i+1,j} + SQ_{i,j+1} + SQ_{i+1,j+1}) \quad (1)$$

The average density level $\overline{Q}$ is one of the integers 0 to 9.

In the second step, when the four-picture-element region in FIG. 1 is converted into a region consisting of nine minute picture elements $O_1$ through $O_9$, the density levels $T_1$ through $T_4$ and $T_6$ through $T_9$ of the minute picture elements $O_1$ through $O_4$ and $O_6$ through $O_9$ surrounding the central minute picture element $O_5$ are calculated from the following equations (2) by utilizing the density levels of the four picture elements in FIG. 1:

$$\left.\begin{aligned}
T_1 &= SQ_{i,j} \\
T_2 &= (SQ_{i,j} + SQ_{i+1,j}) \cdot \tfrac{1}{2} \\
T_3 &= SQ_{i+1,j} \\
T_4 &= (SQ_{i,j} + SQ_{i,j+1}) \cdot \tfrac{1}{2} \\
T_6 &= (SQ_{i+1,j} + SQ_{i+1,j+1}) \cdot \tfrac{1}{2} \\
T_7 &= SQ_{i,j+1} \\
T_8 &= (SQ_{i,j+1} + SQ_{i+1,j+1}) \cdot \tfrac{1}{2} \\
T_9 &= SQ_{i+1,j+1}
\end{aligned}\right\} \quad (2)$$

In the third step, according to whether the average density level $\overline{Q}$ calculated from the aforementioned equation (1) is smaller than five (5) or not, the density level of each minute picture element is determined black or white as follows:

(A) In the case $\overline{Q}=k_1<5$ (where $k_1$ is one of the integers 0 to 4):

The density levels $T_1$ through $T_4$ and $T_6$ through $T_9$ calculated according to the equations (2) are arranged in decreasing order, and the density levels of $k_1$ minute picture elements which are selected from the eight minute picture elements $O_1$ through $O_4$ and $O_6$ through $O_9$ beginning with the minute picture element having the highest density level are determined black, while the density levels of all of ($Q_{MAX}-k_2$) remaining minute picture elements are determined white (in this case $Q_{MAX}=9$). It should be noted that in the case of $k_1=0$, the density levels of all of the minute picture elements $O_1$ through $O_9$ are determined white.

(B) In the case of $\overline{Q}=k_2\geq 5$ (where $k_2$ is one of the integers 5 to 9):

The density levels $T_1$ through $T_4$ and $T_6$ through $T_9$ calculated according to the equations (2) are arranged in increasing order. Then, the density levels of ($Q_{MAX}-k_2$) minute picture elements which are selected from the eight minute picture elements $O_1$ through $O_4$ and $O_6$ through $O_9$ beginning with the minute picture element having the lowest density level are determined white, and the density levels of all of $k_2$ remaining minute picture elements are determined black (in this case $Q_{MAX}=9$). When $k_2=9$, the density levels of all of the minute picture elements $O_1$ through $O_9$ are determined black.

If the above-described calculations and logical determinations according to the results of the calculations are applied to the entire area of the original picture, then a picture having a picture element concentration $1.5\times1.5$ times as high as the picture element concentration of a picture can be obtained; that is, a picture excellent in resolution can be obtained through estimation from an original picture low in picture element concentration.

The above-described method of the invention will be described more concretely.

An original picture is sampled in low picture element concentration to provide picture data. The picture data thus provided are subjected to decimal quantization to determine density levels for the picture elements. The density levels thus determined are, for instance, shown in FIG. 3 (in which the region surrounded by the dotted line is a black level part of the original picture).

In FIG. 3, reference character A designates a picture element region having an arrangement of $2\times2$ picture elements as described before. The average density level $\overline{Q}$ of the region A calculated according to the equation (1) is:

$$(4+8+0+3)\cdot\tfrac{1}{4} = 15/4 \approx 4$$

Then, the region A is converted into a minute picture element region B having an arrangement of $3\times3$ minute picture elements $O_1$ through $O_9$ (FIG. 4) similarly as in the above-described case, and the density levels $T_1$ through $T_4$ and $T_6$ through $T_9$ of the minute picture elements $O_1$ through $O_4$ and $O_6$ through $O_9$ are calculated according to the equations (2), as follows:

$T_1=4$, $T_2=6$, $T_3=8$, $T_4=2$, $T_6=11/2$, $T_7=0$, $T_8=3/2$ and $T_9=3$

Thereafter, according to the third step described above, the logical determination is carried out, and then $\overline{Q}\approx 4<5$. In this case, the density levels of four minute picture elements selected in the decreasing order of the values T are determined black, and the density levels of the remaining five minute picture elements are determined white. That is, the density levels of the minute picture elements $O_3$, $O_2$, $O_6$ and $O_1$ are black, and the density levels of the remaining ones $O_4$, $O_5$, $O_7$, $O_8$ and $O_9$ are white.

Figure 4:
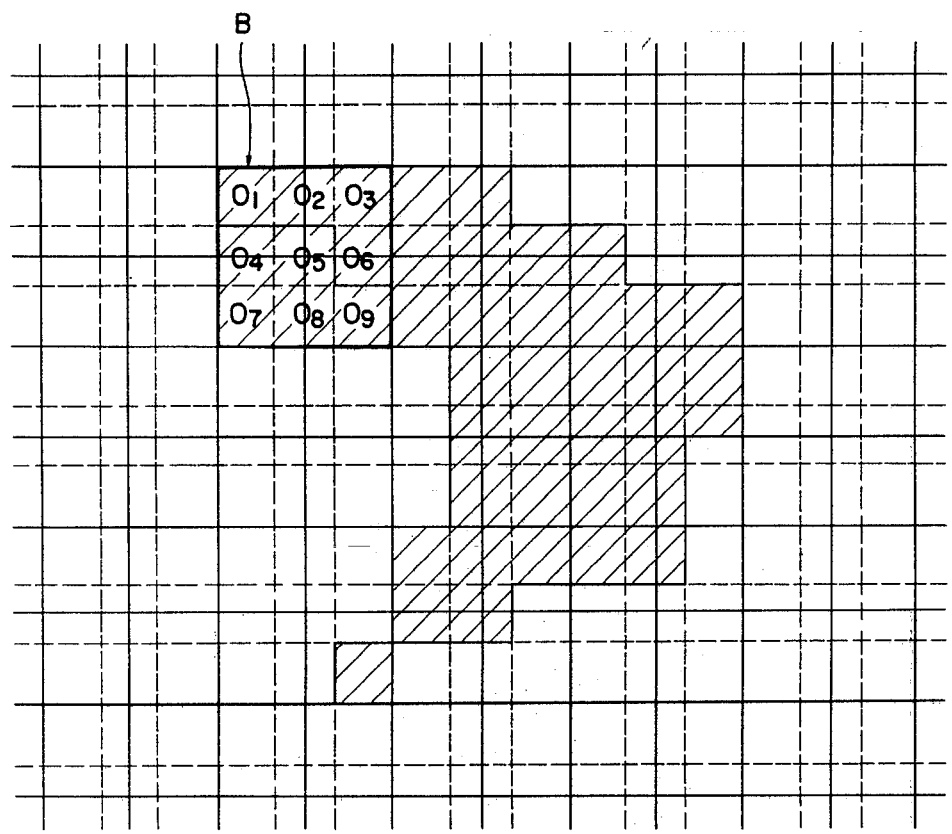
FIG. 4 shows a picture which is produced from the picture shown in FIG. 3 in a method of restoring a picture through estimation according to the invention.

The above-described process is carried out for every $2\times2$ minute picture region of the original picture, as a result of which a picture higher in picture element concentration can be obtained as shown in FIG. 4.

Figure 5:
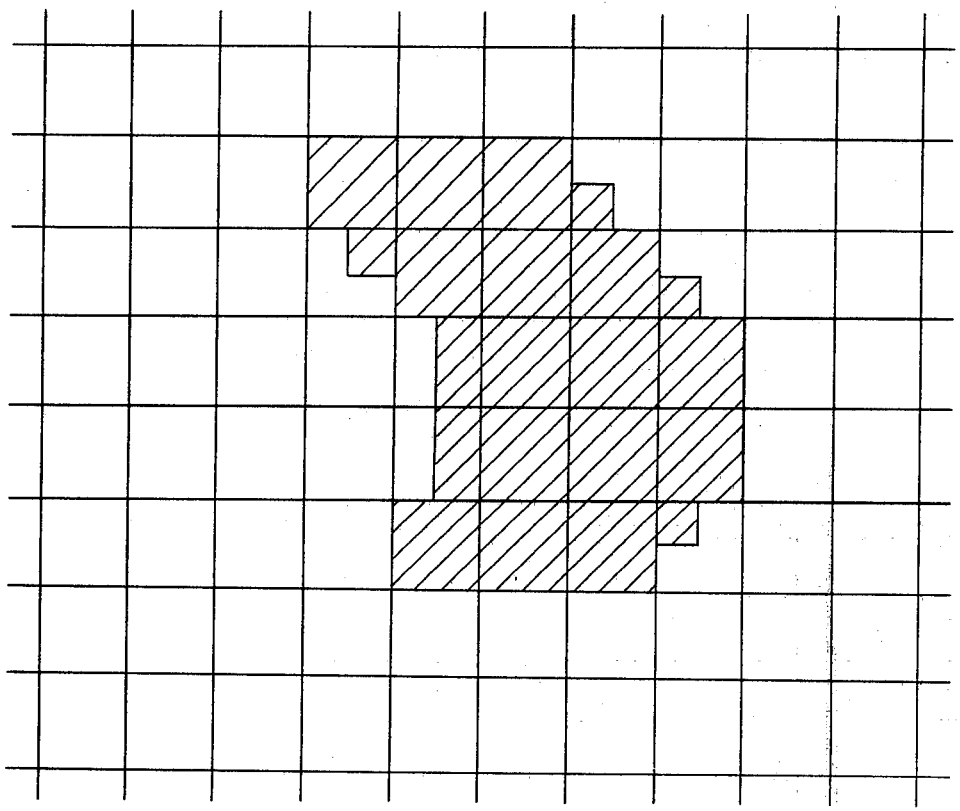
FIG. 5 shows a picture which is obtained by processing the inputs picture in FIG. 3 according to the conventional picture restoring method.

FIG. 5 shows a picture which is obtained by processing the picture in FIG. 3 according to the conventional picture restoring method. As is clear from comparison between the picture shown in FIG. 5 and the picture shown in FIG. 4, the method of the present invention is more excellent in reproducibility of curves and the picture according to the method of the invention is higher in resolution.

FIG. 6 shows one example of an apparatus for practicing the method according to the invention. The apparatus comprises: a quantizer 1 for subjecting to decimal quantization of the input picture signal of each of the picture elements which are obtained by scanning an original picture in low picture element concentration; an input buffer 2 for temporarily and collectively storing the input picture signals thus quantized; a memory 3 for storing the output of the buffer 2; an addressing unit 4 for successively calling $2\times2$ picture element regions to be processed in high picture element concentration out of the contents of the memory 3 according to externally applied address signals; and a calculator 5 for conducting the calculations of the equations (1) and (2) according to the contents which are called out of the memory 3 by the addressing unit 4.

The apparatus further comprises: a determining unit 6 for conducting the logical determinations according to the calculation results of the calculator 5 as described in the above-described paragraphs (A) and (B); a level generator 7 for determining whether the density level of each minute picture element in each 3×3 minute picture element region is white or black, according to the determination results of the determining unit 6 and the outputs of the calculator 5; and an output buffer 8 for temporarily and collectively accumulating the level signals to output signals representative of a picture which has been restored in high picture element concentration through estimation.

While the method of the invention has been described with respect to the case where a low concentration picture element region having an arrangement of 2×2 picture elements is converted into a high concentration picture element region having an arrangement of 3×3 minute picture elements, it should be noted that the invention is not limited thereto or thereby. That is, the invention can be applied to the case where, typically, a low concentration picture element region having an arrangement of n×n picture element is converted into a high concentration picture element region having an arrangement of 1.5 n×1.5 n minute picture elements. N means here each minute picture element which has been formed by dividing an information on two-dimensional plane by unit length along X-direction or Y-direction. The size of a full picture is represented by the product of the number of minute picture elements along X-direction and that of minute picture elements along Y-direction. If both numbers along X-direction and Y-direction are equal to each other, the size of a full picture is represented by n×n.

As is apparent from the above description, in the method of the invention, an original picture is read into a plurality of picture elements by sampling it in low picture element concentration, each picture element region having an arrangement of n×n picture elements is converted into a minute picture element region having an arrangement of 1.5 n×1.5 n minute picture elements, the density levels of the picture elements in the picture element region are subjected to decimal quantization to provide decimal-quantized density levels, the average density level is obtained from the decimal-quantized density levels thus provided, the density level data of the selected minute picture elements in the minute picture element region are determined according to the distribution in density level of the picture elements in the picture element region, by utilizing the predetermined calculation equations, and the density levels of the minute picture elements are determined through the predetermined logical determination from the average density level and the density level data of the minute picture element. Accordingly, a picture high in quality and excellent especially in the resolution of curves can be restored in high picture element concentration through estimation.

What is claimed is:

1. A method of restoring a picture through estimation, comprising the steps of:

reading an original picture into a plurality of first picture elements by sampling said original picture in relatively low picture element concentration, said first picture elements being divided into first picture element regions each of which has an arrangement of n×n first picture elements;

converting each first picture element region into a second picture element region which has an arrangement of 1.5 n×1.5 n second picture elements each of which is smaller in area than each first picture element;

subjecting the density levels of the first picture elements in each first picture element region to decimal quantization to provide the average value of the density levels thus decimal-quantized;

obtaining the density level data of predetermined second picture elements in each second picture element region by using predetermined equations corresponding to the distribution of the density levels of said first picture elements in each first picture element region; and determining the density levels of said second picture elements in each second picture element region as black or white according to said average value and the order in magnitude of said density level data.

2. A method of restoring a picture through estimation claimed in claim 1, wherein first picture element regions each of which has an arrangement of 2×2 first picture elements are converted into second picture element regions each of which has an arrangement of 3×3 second picture elements, respectively.

* * * * *